Figure 1:
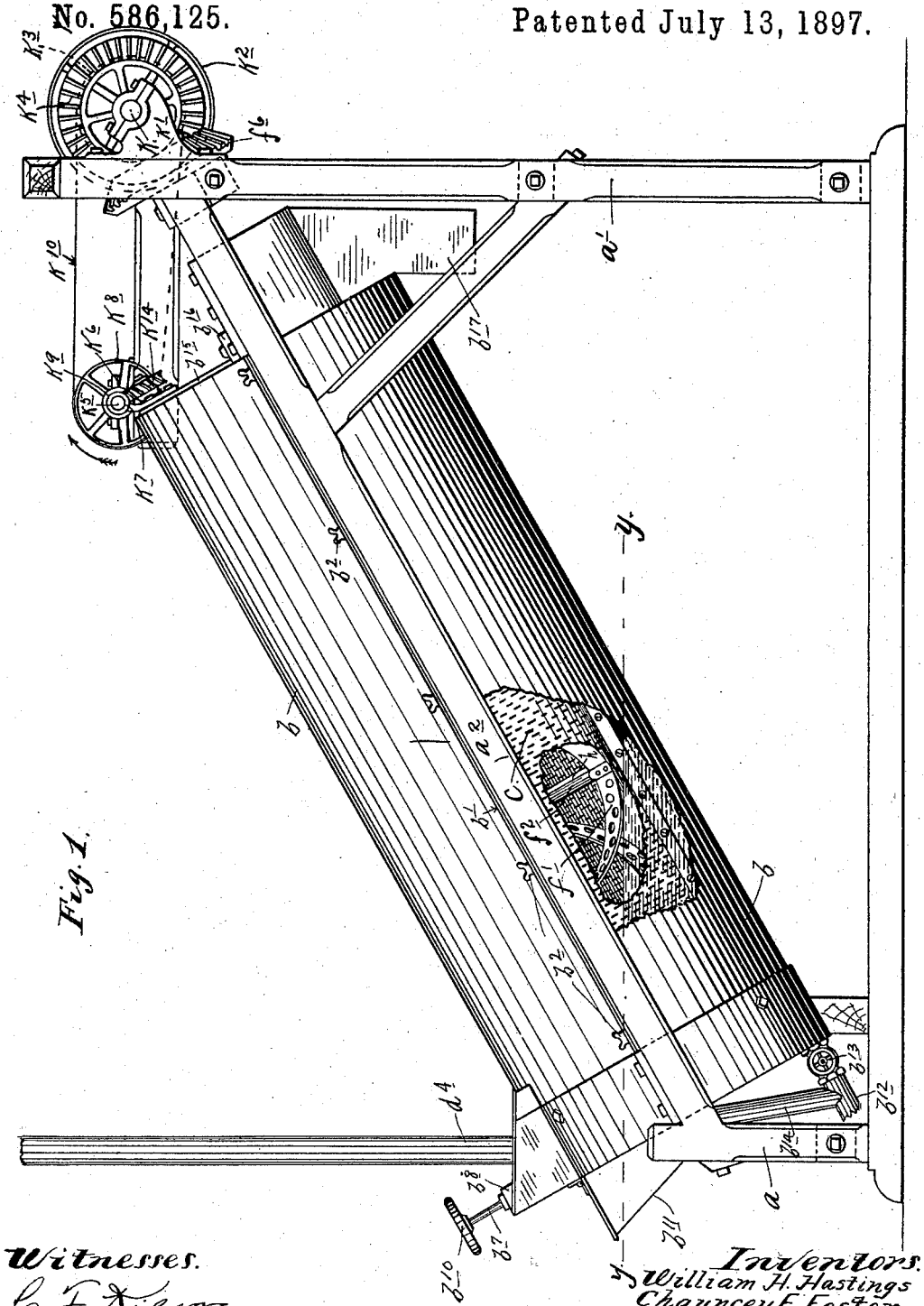

(No Model.) 2 Sheets—Sheet 1.

W. H. HASTINGS & C. E. FOSTER.
GRAIN WASHER.

No. 586,125. Patented July 13, 1897.

Witnesses.
C. F. Kiegre
D. D. Merchant

Inventors.
William H. Hastings
Chauncey E. Foster
By their Attorney.
Jas. F. Williamson

THE NORRIS PETERS CO., PHOTO-LITHO., WASHINGTON, D. C.

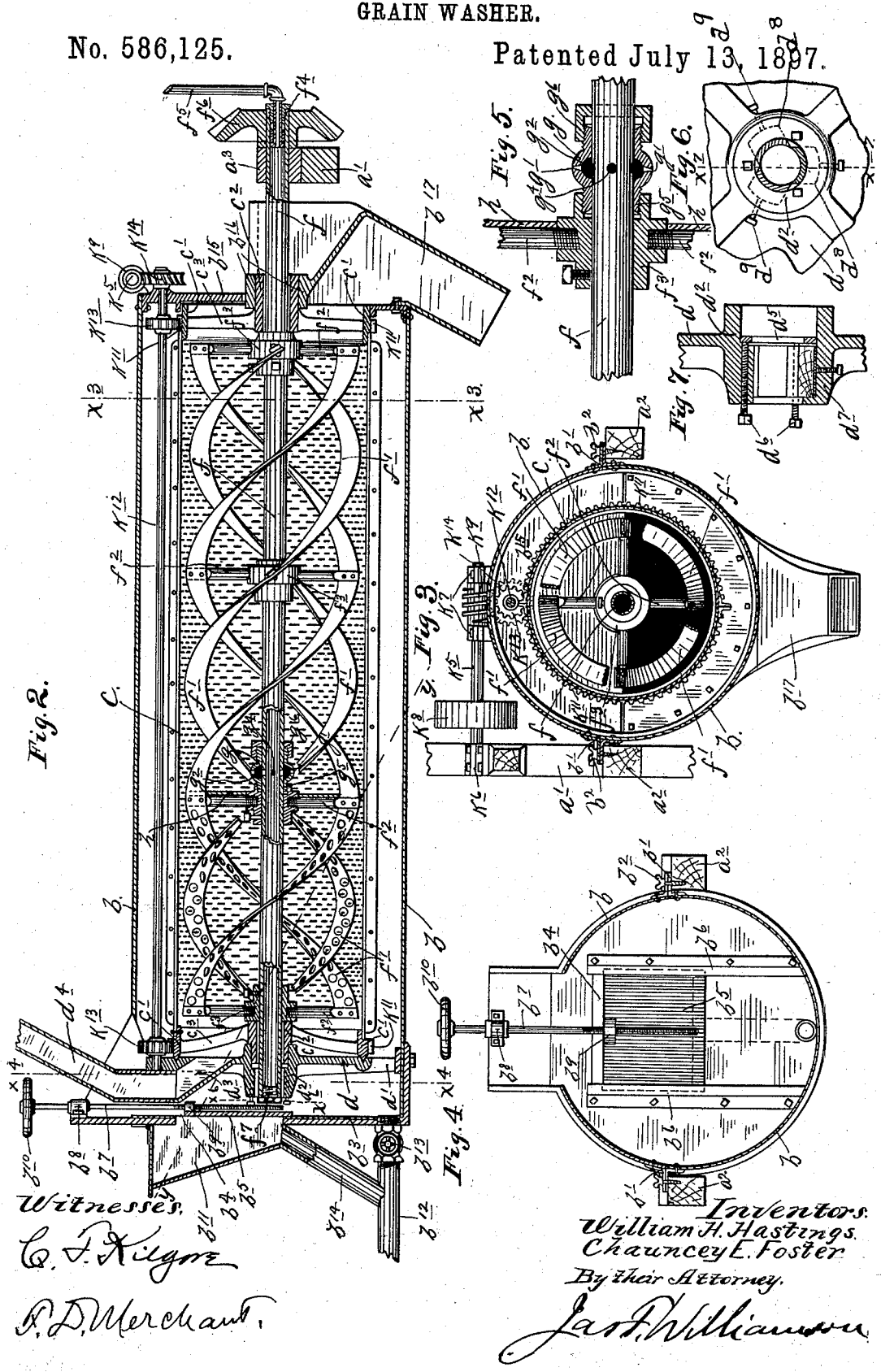

UNITED STATES PATENT OFFICE.

WILLIAM H. HASTINGS AND CHAUNCEY E. FOSTER, OF MINNEAPOLIS, MINNESOTA.

GRAIN-WASHER.

SPECIFICATION forming part of Letters Patent No. 586,125, dated July 13, 1897.

Application filed April 27, 1896. Serial No. 589,217. (No model.)

*To all whom it may concern:*

Be it known that we, WILLIAM H. HASTINGS and CHAUNCEY E. FOSTER, citizens of the United States, residing at Minneapolis, in the county of Hennepin and State of Minnesota, have invented certain new and useful Improvements in Grain-Washers; and we do hereby declare the following to be a full, clear, and exact description of the invention, such as will enable others skilled in the art to which it appertains to make and use the same.

Our invention has for its especial object to provide an improved method of and apparatus for washing and cleaning grain.

Our method consists, essentially, in submerging the grain in water and subjecting the water and grain to a beating action while under centrifugal force.

Our improved method also preferably comprises, in connection with the above-noted features of manipulation, an additional step, which consists in rinsing the washed grain by a spray of clean water while still under the action of centrifugal force.

Our apparatus is especially designed to carry out the above method and to facilitate in general the washing and cleaning of grain and other cereals.

To these ends our invention comprises the novel devices and combinations of devices hereinafter described, and defined in the claims.

The preferred form of our invention is illustrated in the accompanying drawings, wherein, like letters referring to like parts throughout the several views—

Figure 1 is a side elevation, with some parts broken away, showing the preferred form of our improved apparatus or machine. Fig. 2 is a vertical longitudinal section taken centrally through the machine shown in Fig. 1, the framework of the apparatus or machine being removed and the body of the apparatus being turned down into horizontal position. Fig. 3 is a transverse section taken through the apparatus on the line $X^3 X^3$ of Fig. 2, looking toward the right, with some parts removed. Fig. 4 is a view taken through the apparatus, substantially on the line $X^4 X^4$ of Fig. 2, looking toward the left, some parts being removed. Fig. 5 is a detail view, principally in section, showing a portion of the reel and a spraying device carried thereby. Fig. 6 is a section taken substantially on the line $X^6 X^6$ of Fig. 2, some parts being broken away; and Fig. 7 is a longitudinal section taken on the line $X^7 X^7$ of Fig. 6.

$a\ a'\ a^2$ is a skeleton-like frame formed of strong parts, of which $a$ is the front end support, $a'$ the rear end support, and $a^2$ a pair of parallel inclined beams which unite said end sections $a$ and $a'$.

$b$ indicates a water receptacle or tank, which, as shown, is in the form of a cylinder which is secured in an inclined position between the inclined frame-timbers $a^2$ by means of angle-irons $b'$, riveted to said tank $b$ and secured to said beams $a^2$ by means of screws $b^2$. The lower end of the cylindrical tank $b$ is provided with a head $b^3$, formed near its central portion with a discharge-orifice $b^4$. This discharge-orifice $b^4$ is adapted to be opened and closed more or less, as may be desired, so as to vary the altitude of the column of water contained in the inclined tank $b$, by means of a sliding gate $b^5$, working in guides $b^6$, secured on the inner side of said head $b^3$. This gate $b^5$ will be seated against the head $b^3$ to form a water-tight joint by the pressure of the column of water within the tank $b$. The vertical adjustment of the gate $b^5$ may be effected by means of a screw-rod $b^7$, mounted for rotary, but fixed against endwise movement, in a block $b^8$ on the head $b^3$ and having screw-threaded engagement with a nut-block $b^9$ on said gate $b^5$. At its upper end the screw-rod $b^7$ is provided with a hand-wheel $b^{10}$ by means of which it may be turned.

As shown, the discharge-orifice $b^4$ opens directly into a box-like extension $b^{11}$ of the head $b^3$. The extreme lower portion of the head $b^3$ is tapped by a valved draw-off pipe $b^{12}$ $b^{13}$, through which, as will later appear, the water contained in the tank $b$ may be entirely drawn off.

$b^{14}$ indicates a branch pipe which connects the lower portion of the water-box $b^{11}$ with the draw-off pipe $b^{12}$ at a point outward of its valve $b^{13}$.

The upper end of the cylindrical tank $b$ is provided with a head $b^{15}$, formed at its center with a journal-box $b^{16}$ and at its lower portion with a discharge-spout $b^{17}$.

The tank just described may be filled with water up to the top of the adjustable gate $b^5$, and the altitude of this column of water may be assumed to be, in the adjustment shown, substantially as indicated by the lines $y\ y$ on Figs. 1 and 2.

$c$ indicates a perforate cylindrical drum, which is of less diameter than the cylindrical tank $b$ and is mounted for rotary motion within the same. At its ends this perforate cylinder $c$ terminates in or is rigidly secured to annular sections or rings $c'$, which are connected to hollow trunnions $c^2$ by means of radial arms $c^3$. The projecting edge of the lower member of the annular sections $c'$ is shown as sharp or V-shaped and works in a correspondingly-formed annular groove cut in the inner face of a non-rotary head $d$. This non-rotary head $d$ is fixed to the tank-section $b$ by means of legs or other diverging projections $d'$. At its central portion this head $d$ is provided with a journal-box $d^2$.

The upper and lower members of the trunnions $c^2$ of the spider-like heads of the perforate rotary drum $c$ are mounted, respectively, in the journal-boxes $b^{16}$ and $d^2$ of the heads $b^{15}$ and $d$.

The fixed head $d$ is provided at its upper portion with an inlet-passage or neck portion $d^3$, which connects with a supply-chute $d^4$, through which and said passage $d^3$ grain is supplied by gravity to the lower end of the perforate rotary drum $c$.

In connection with the lower trunnion $c^2$ and the journal-box $d^2$ of the non-rotary head $d$ we preferably provide a device whereby the perforate rotary drum $c$ may be given a slight longitudinal adjustment, so that, while a grain-tight joint is formed between the head $d$ and the lower end of the lower ring $c'$, frictional engagement between the same may be prevented. As shown, this device comprises a loose ring $d^5$, which bears against the lower end of said lower trunnion $c^2$ and is subject to the action of set-screws $d^6$, working through the outer end of the journal-box $d^2$ and impinging against said ring $d^5$, as shown in Figs. 2 and 7.

A combined beater and conveyer is mounted for rotary motion within the perforate rotary drum $c$. As shown, this combined beater and conveyer is in the form of a reel which comprises a hollow shaft $f$, provided with screw or spiral blades $f'$, spaced apart therefrom, but rigidly connected therewith by means of radial arms $f^2$, the inner ends of which are screwed into collars $f^3$, secured on said shaft $f$.

The longitudinal dimensions of the screw-blades $f'$ are such that they will work entirely between the two spider-like heads $c\ c^2\ c^3$ of the drum $c$. When mounted in working position, the lower end of the reel-shaft $f$ works loosely through the hollow trunnion $c^2$ of the lower drumhead $c'\ c^2\ c^3$ and is journaled in and supported by the contracted portion $d^7$ of the journal-box $d^2$, while the upper end of said shaft $f$ works loosely through the upper member of the hollow trunnion $c^2$ and is journaled in a bearing-box $a^3$, fixed to the frame-section $a'$. The extreme upper end of the hollow shaft $f$ is connected by means of a swiveled stuffing-box $f^4$ with a water-supply pipe $f^5$ and is provided on its exterior with a bevel-wheel $f^6$.

At its extreme lower end the hollow shaft $f$ is closed by a water-tight plug $f^7$, screwed thereinto. As shown, the contracted portion $d^7$ is fitted with a series of radially-adjustable wearing-blocks $d^8$, subject to the action of set-screws $d^9$, working through said portion $d^7$, as shown in Figs. 6 and 7.

The rinsing device shown in the accompanying drawings is formed on the hollow reel-shaft $f$ and is located at such a point on the same that the spray of clean water discharged therefrom into the perforate rotary drum will strike the grain, which has been washed by the body of water in the tank $b$, above the normal level of said column of water. This spraying device, as shown, comprises an annular nozzle-section $g$, having a series of circumferentially-arranged discharge-perforations $g'$, which open from an annular cavity $g^2$, formed in said nozzle-piece $g$, and in communication, through perforations $g^4$, with the interior of the hollow reel-shaft $f$. It will be noted, by reference particularly to Fig. 5, that the nozzle-piece $g$ has a stuffing-box connection $g^5$ with one of the shaft-collars $f^3$ at one end, and at its other end it is provided with a stuffing-box $g^6$. These stuffing-boxes $g^5$ and $g^6$ insure water-tight joints between the nozzle-piece $g$ and the reel-shaft $f$.

On the reel, just below the spraying-nozzle $g$, is secured a dividing-dashboard or baffle-plate $h$. As shown, this baffle-plate $h$ is in the form of a disk and is rigidly secured to the shaft-collar $f^3$ and radial arms $f^2$ of one of the reel-blade supports.

Rotary motion is imparted to the combined beating and conveying reel and to the rotary perforate drum by means of the following driving devices:

$k$ indicates a short shaft mounted transversely of the machine in bearing-brackets $k'$, secured to the upper end of the frame-section $a'$. This shaft $k$ is provided with a pair of pulleys $k^2\ k^3$ and with a bevel-wheel $k^4$, which is in mesh with the bevel-wheel $f^6$, carried by the hollow reel-shaft $f$.

$k^5$ indicates a counter-shaft located parallel with the shaft $k$, mounted in a bearing-box $k^6$ on the frame-section $a'$ and in bearing-boxes $k^7$, fixed on the tank-head $b^{15}$. This counter-shaft $k^5$ is provided with a pulley $k^8$ and a worm $k^9$.

$k^{10}$ indicates a belt running over the pulleys $k^3$ and $k^8$. The annular end portions $c'$ of the rotary perforate drum $c$ are provided on their peripheries with gear-teeth $k^{11}$.

$k^{12}$ indicates a long shaft positioned parallel with the reel-shaft $f$ and loosely mounted in the non-rotary heads $d$ and $b^{15}$, respectively, of the rotary drum $c$ and the fixed tank $b$. This shaft $k^{12}$ is provided within the tank $b$ with a pair of spur-pinions $k^{13}$, which are in mesh with the teeth $k^{11}$ of the annular drum-sections $c'$, and is provided at its upper end exterior of the tank $b$ with a worm-gear $k^{14}$, which coöperates with the worm $k^9$ on the counter-shaft $k^5$.

Motion is imparted to the machine by means of a belt (not shown) running over the pulley $k^2$ of the shaft $k$ and extending from some suitable power device. (Not shown.) Motion being thus imparted to the shaft $k$, it is evident that through the connections just described rotary motions will be imparted to the beating and conveying reel $f\,f'\,f^2$ and to the perforate drum $c$. The relations of the driving connections just described are such that both the reel and the perforate drum will be rotated in the same direction at a ratio of about one hundred and fifty revolutions of said reel to four revolutions of said drum.

The tank $b$ being first partially filled with water, as already indicated, and the motions being imparted to the machine, as just described, the operation of the machine on the wheat or other grain which is fed into the lower end of the rotary perforate drum $c$ through the spout $d^3\,d^4$ will be substantially as follows: The grain will be first dropped into the column of water, which, through the perforations of said drum $c$, will be permitted to rise to the level indicated in the drawings by the line $y\,y$ and will thereby be moistened. The grain will, however, be almost instantly caught by the beating-blades $f'$ of the reel. These blades $f'$, running, as they do, at a very high rate of speed, will beat and dash the water and the grain together and against the perforate drum $c$, thereby causing the grain to tend to form a thin layer over the inner surface of said perforate drum $c$; but the grain is never allowed to rest. Under the action of centrifugal force and the beating action of the beating-blades $f'$ the grain will be dashed through the column or body of water and then, as it is carried farther upward by the revolution of the reel, commingled with water, the water by the action of centrifugal force will be thrown outward through the perforations of the perforate drum $c$, while the grain will be carried onward and again dashed into the column of water. Thus by the conjoint action of centrifugal force and the beating action of the reel-blades the grain will be washed over and over again.

In virtue of the spiral or screw arrangement of the beater-blades $f'$ the grain will, under the rotation of the reel, be continually worked upward through the rotary drum $c$ toward the spout $b^{17}$, through which it will be discharged.

If desired, the blades $f'$ may be perforated, as shown at $f^8$, or otherwise cut away, so as to decrease the propelling or conveying action of the same and thus retarding the longitudinal travel of the grain through the drum $c$ and correspondingly increasing the beating action.

As the grain is conveyed upward through the drum $c$ out of the water and above or beyond the baffle-plate $h$ it is subjected to the rinsing action of a spray of clear water delivered from the spraying-nozzle $g\,g'$, carried by the reel-shaft. This spray of clear water being delivered onto the grain while the same is under centrifugal force the grain will be quickly rinsed and cleaned of the soiled water with which it was washed in the lower end of the drum. The term "soiled water" is used to describe the body of water in the tank, because this water, being used over and over again, must of necessity become more or less laden with dirt from the wheat. This body of water may, however, be kept from becoming too dirty for good work by the overflow through the discharge-orifice $b^4$, and if necessary for this purpose the valve $b^{13}$ and the draw-off pipe $b^{12}$ may be opened slightly, so as to permit a slow escape of water from the bottom of the tank.

Returning to the washing and rinsing action of the apparatus, it is important to note that the baffle-plate or dashboard $h$ practically divides the rotary drum $c$ into two compartments, one containing the body of washing-water and the other the spraying device or rinsing-nozzle. The compartments thus formed are, of course, in communication with each other throughout a complete circle adjacent to the perforated surface of said drum, so as to permit the upward passage of the grain. This baffle-plate $h$, however, practically confines the agitated water of the tank to the lower end of the drum $c$ and prevents the same from being splashed upward onto the grain after it has been rinsed by the spraying device.

The grain will pass upward from the spraying device thoroughly cleaned, and under the continued action of centrifugal force will, by the time it reaches the upper end of the rotary drum, from whence it is discharged through the spout $b^{17}$, be partially dried.

The time intervening between the instant that the grain is submerged in the water and the instant it passes from the spray of the rinsing device is but a few seconds, and hence the grain will not have time to become soaked to any depth. In other words, with the above apparatus we obtain the maximum cleaning or washing action in a minimum of time. This is exactly what is desirable for washing wheat, for the hull or bran portion of the same if allowed to soak too long will be caused to wrinkle and crack.

As already indicated, the height of the column of water in the tank $b$ may be varied by means of the adjustable gate $b^5$, which opens and closes the discharge-orifice $b^4$. By this means the body of water to which the grain will be subjected in the lower end of the rotary drum may be varied at will, so as to cause the grain to be more or less moistened, as may be desired, and to adapt the apparatus to wash a large or a small flow of grain.

It will be understood, of course, that the supply of water to the hollow shaft $f$ and spraying device is delivered through the supply-pipe $f^5$, which is in communication with some suitable source of water-supply under pressure, which is not shown.

Attention is called to the fact that the worm and worm-gear $k^9$ $k^{14}$, which form part of the driving connections to the rotary drum $c$, while serving to force the rotary drum $c$ forward at the rate of about four revolutions to the minute serve also to prevent said drum $c$ from being turned forward at a greater rate of speed. This is important, as otherwise the reel, which runs at about one hundred and fifty revolutions a minute, would tend to drive the drum $c$ forward at the same rate.

The purpose of rotating the perforate drum $c$ is to constantly change the perforate surface of the same, so that cleaned portions thereof will be constantly turned downward.

The efficiency of the above-described machine must be obvious from the foregoing.

It will of course be understood that while we have in connection with the preferred form of our machine used various specific terms to describe the same and have set forth the structural features thereof specifically, we do not intend to limit ourselves to specific details of construction, except where positively set forth in the claims.

What we claim, and desire to secure by Letters Patent of the United States, is as follows:

1. The combination with a water-tank, of an inclined vessel and a combined beater and conveyer coöperative within the same, both set with their lower ends partially submerged in the water, a dashboard or baffle-plate, in said inclined vessel above the water-level of the same, and a fresh-water-spraying device discharging into the washed grain in said vessel above said dashboard, substantially as described.

2. The combination with a water-tank, of an inclined perforate rotary drum with its lower end partially submerged in the water of said tank, and provided thereat with a non-rotary head working with a grain-tight joint against the same, an adjustable bearing-piece working against the lower end of the lower hub of said drum, and a combined beater and conveyer working in said drum and journaled at its lower end in said head, substantially as described.

3. The combination with a water-tank, of an inclined drum and a combined beating and conveying reel coöperating within said drum, both set with their lower ends partially submerged in the water, a dashboard or baffle-plate carried by said reel above the water-level, and a fresh-water-spraying device discharging onto the washed grain above said dashboard, substantially as described.

4. The combination with a water-tank, of an inclined drum, a combined beating and conveying reel, involving a hollow shaft and screw-blades spaced apart therefrom but connected therewith by diverging arms, said drum and said reel coöperating, with their lower ends in the water, a dashboard or baffle-plate carried by said reel, above the water-level, and a spraying device discharging from said hollow reel-shaft into said drum, above said dashboard, substantially as described.

5. The combination with a water-tank, of an inclined rotary drum with non-rotary head at its lower end, a combined beating and conveying reel, involving a hollow shaft journaled at its lower end in said non-rotary head, and screw-blades spaced apart from said shaft but connected therewith, by diverging arms, a dashboard or baffle-plate carried by said reel, above the water-level, and a spraying device discharging from said hollow shaft above said dashboard, substantially as described.

In testimony whereof we affix our signatures in presence of two witnesses.

WILLIAM H. HASTINGS.
CHAUNCEY E. FOSTER.

Witnesses:
JAS. F. WILLIAMSON,
E. F. ELMORE.